(12) United States Patent
Pershan

(10) Patent No.: US 6,865,266 B1
(45) Date of Patent: Mar. 8, 2005

(54) METHODS AND APPARATUS FOR TRANSFERRING FROM A PSTN TO A VOIP TELEPHONE NETWORK

(75) Inventor: Barry Paul Pershan, Olney, MD (US)

(73) Assignee: Verizon Services Corp., Arlington, VA (US)

( * ) Notice: Subject to any disclaimer, the term of this patent is extended or adjusted under 35 U.S.C. 154(b) by 355 days.

(21) Appl. No.: 10/050,649

(22) Filed: Jan. 16, 2002

(51) Int. Cl.[7] .............................................. H04M 7/00
(52) U.S. Cl. ........................... 379/221.13; 379/201.01; 379/221.09; 379/210.02
(58) Field of Search ....................... 379/210.02, 220.01, 379/201.01, 221.01, 221.08, 221.09, 221.1, 221.13, 221.14, 207.02, 229, 230, 207.15, 211.01, 211.02, 88.17; 370/401, 354, 352, 356, 466, 410; 455/428, 461, 445

(56) References Cited

U.S. PATENT DOCUMENTS

| | | | | |
|---|---|---|---|---|
| 5,881,145 A | * | 3/1999 | Giuhat et al. | .......... 379/221.13 |
| 6,021,126 A | * | 2/2000 | White et al. | ................ 370/352 |
| 6,243,374 B1 | * | 6/2001 | White et al. | ................ 370/352 |

OTHER PUBLICATIONS

TeleDNS, "Welcome to the teleDNS Project", downloaded from http://www.enumworld.com on Jan. 8, 2002, pps. 1–2.
Carolyn Duffy Marsan, *Network World Fusion*, dated Sep. 26, 2000 "Telecordia, VeriSign to marry telephone, Net numbers", Sep. 26, 2000, downloaded from http://www.n-wfusion.com/news/2000/0926telecordia.html on Jan. 8, 2002, pps. 1–4.
ENUM, "Welcome to ENUM.ORG", downloaded from http://www.enum.org. on Jan. 8, 2002, pps. 1–2.
"Protocol Action: SIP: Session Initiation Protocol to Proposed Standard", dated Feb. 2, 1999, downloaded from http://www.cs.columbia.edu/sip/proposed.txt on Jan. 8, 2002, pps. 1–2.
P. Faltstrom, Cisco Systems Inc., dated Sep. 2000, Category: Standards Track, "E.164 number and DNS", downloaded from ftp://ftp.isi.edu/in–notes/rfc2916.txt on Dec. 24, 2001, pps. 1–9.
Carolyn Duffy Marsan, *Network World*, dated Sep. 24, 2001, Buzz 2001: "The Enum phenomenon", downloaded from http://www.nwfusion.com/buzz2001/enum on Dec. 24, 2001, pps. 1–6.
M. Handley et al., Network Working Group, Category: Standards Track, "SIP: Session Initiation Protocol", downloaded from ftp://ftp.isi.edu/in–notes/rfc2543.txt on Jan. 8, 2002, pps. 1–134.

* cited by examiner

*Primary Examiner*—Curtis Kuntz
*Assistant Examiner*—Barry W Taylor
(74) *Attorney, Agent, or Firm*—Leonard C. Suchtya, Esq.; Joseph P. Palmieri, Esq.; Straub & Pokotylo

(57) ABSTRACT

AIN based methods and apparatus for transitioning telephone numbers and customers from the PSTN to a VOIP network are described. AIN line number portability features are used to allow a few gateway switches that interconnect the PSTN and VOIP networks to service customers whose telephone numbers were originally serviced by several remote PSTN switches. AIN LNP triggers are used to forward PSTN calls, directed to the PSTN switch previously used to service a telephone number, to the gateway switch assigned to route such calls to the IP network. AIN triggers set at the gateway switch insure that the subscriber with the ported telephone number continues to receive AIN services provided before the telephone number was ported to the IP network. Calls from ported telephone numbers to telephones in the PSTN are billed from PSTN switches through the use of AIN functionality and triggers set at the gateway switch.

15 Claims, 6 Drawing Sheets

… … …

METHODS AND APPARATUS FOR TRANSFERRING FROM A PSTN TO A VOIP TELEPHONE NETWORK

FIELD OF THE INVENTION

The present invention is directed to communication systems, and more particularly, methods and apparatus for transitioning telephone services from the existing Public Switched Telephone Network (PTSN) to a Voice Over Internet Protocol ((VOIP)) telephone network.

BACKGROUND OF THE INVENTION

The use of telephones for communications purposes is commonplace and often taken for granted. If someone wants to talk to another person on the other side of the country, he or she can pick up a telephone and dial the person's phone number. A ringing noise is heard and normally, the called party answers the phone. Presently, in most cases, the ensuing cross-country conversation is carried over the Public Switched Telephone Network (PSTN). The PSTN has been upgraded on a nearly continuous basis as advances in technology have made improvements possible. For example, fiber optic lines have replaced the use of copper lines in many parts of the PSTN. In addition, digital telephone switches have replaced older analog telephone switches.

While significant changes have been made to the PSTN over the years, to the end user, i.e., customer, these changes have been relatively transparent. In most cases, end users have been allowed to keep their existing telephone numbers and receive their existing telephone services despite network changes resulting from network upgrades. As known in the art, the PSTN uses a Time Division Multiplexing (TDM) based network.

Telephone service providers are currently confronting the possibility of a transition from the current TDM based network to IP packet based networks which are likely to carry voice calls in the future. Unless significant steps are made to smooth the transition to a telephone system based on VOIP, this transition represents a dramatic development that has the potential for presenting customers with noticeable changes in their telephone services, including telephone number changes.

As technology evolves once again and the prospect of moving from a Time Division Multiplexing (TDM) based network to a Voice over IP ((VOIP)) based network becomes more of a reality, several major issues arise.

From a technical standpoint, e.g., from a telephone switch deployment and operational perspective, there is the issue of how to move calls and users from the PSTN to the VOIP network and back, as may be required.

In addition to the issues of physical implementation, there is the practical issue of how to make the transition to a VOIP telephone system as transparent as possible to telephone users. For example, it is highly desirable that phone numbers should not change, and preferably the telephone services that a customer currently receives should continue to function. Maintaining existing phone numbers is particularly important to large companies who want to keep their phone numbers for business purposes. In addition, services such as call forwarding, call waiting, voice mail, etc. are used by many end users, and an interruption in these billable services would be an inconvenience, and may hurt the telephone company from both a customer satisfaction and revenue standpoint.

Companies, even more so than individuals, tend to be risk adverse when it comes to implementing new technology. For this reason, large companies who use multiple phone lines, will probably want to migrate to a VOIP network gradually, e.g., a few lines at a time. This is likely to be the case at least until the (VOIP) technology has been proven to be reliable. For example, if a company has 100 telephone lines it may only want to convert 25 of those lines into VOIP network telephone lines, in order to test the new technology without potentially losing all communications. In addition, before committing to switching lines to the (VOIP) telephone network, a company may want assurances that it will be able to switch the telephone lines back to the existing PSTN on short notice in the event that difficulties are encountered with the VOIP service.

A gradual transition of the type likely to occur presents hardware deployment challenges to telephone companies. Telephone companies may wish to provide VOIP telephone service for a small number of lines serviced by an existing switch, e.g., 25 lines out of a company's 100 lines, without having to make hardware upgrades to, or replace, the telephone switch which directly services the company's office. Given the cost of upgrading switches, it may only be justifiable from a cost standpoint, to upgrade an otherwise functional telephone switch, when a large number of subscribers or telephone lines serviced by the switch are ready to be transferred to VOIP service. Unfortunately, it is unlikely that a large number of users will agree to switch to a relatively new and somewhat unproven technology all at once.

In order to provide enhanced telephone services, many telephone companies now support, as part of the PSTN, Advanced Intelligent Network (AIN) functionality. AIN capabilities have made it easier to provide a wide array of previously unavailable telephone services. In an AIN system, telephone central offices each include one or more switches, each of which serves as a signal switching point (SSP).

Each SSP can detect one of a number of call processing events called AIN "triggers" or events. One such trigger is a Specific Digit String (SDS) trigger.

This trigger is activated based on exact matches in the digits of a phone number, with a corresponding set of trigger digits. For example, if an SSP has an SDS six digit trigger set to 123-456, then any call passing through the switch directed to a phone number starting with 123-456 will activate that trigger. A local number portability (LNP) trigger is a type of trigger that will also be activated in response to a specific set of digits in a call matching a set of digits set as part of the LNP trigger.

When an AIN trigger is activated at an SSP because of the occurrence of a trigger event, the SSP suspends processing of the call that activated the trigger and generates a call processing message, e.g., a TCAP message, used to obtain call processing instructions from a service control point (SCP). The SSP forwards the call processing message, e.g., via a common channel interoffice signaling (CCIS) link utilizing the Signal System 7(SS7) protocol, to a Service Control Point (SCP). The SCP determines the appropriate call processing instruction(s) to be sent from the switch based on software instructions and, in many cases, call specific information received from the switch. The call specific information may include, e.g., the calling party telephone number, the called party telephone number and one or more additional numbers or fields included in the call processing message received by the SCP which are available from a call transmitted in accordance with the SS7 standard.

The SCP may be implemented as an integrated service control point (ISCP). ISCPs normally include service creation logic and other functionality sometimes omitted from standard SCPs. If needed, the SCP can instruct the SSP at which the AIN trigger was activated to obtain and forward additional information, e.g., information relating to the call.

In response to a call processing message, the SCP accesses one or more stored call processing information or records (CPRs) to generate from the data received from the SSP one or more control messages. The call control messages are used to instruct the SSP on how to process the call that activated the AIN trigger. As part of a call control message, an ISCP can instruct the SSP to complete, e.g., forward the call, to a destination number provided by the SSP. Thus, an SCP can redirect a call in response to activation of an AIN trigger.

The SCP also has the ability to send the call to an outside resource, such as an intelligent peripheral using a send to outside resource (STOR) instruction. Intelligent peripherals are frequently coupled to SSPs to provide message announcement capabilities, voice recognition capabilities and other functionality which is not normally provided by the SSP.

In response to control messages, the SSP completes the phone call to which the control message relates as instructed by the control message.

In order to be allowed to compete in both he local and long distance telephone markets, some providers of local telephone service have had to open up the markets in which they provide local telephone service to competition. This often involves providing a mechanism by which a competitor's telephone switch can be used to provide local call routing and billing operations despite the fact that the customer's telephone line is not directly connected to the competitor's switch.

Some telephone service providers use AIN functionality and in particular, the AIN Local Number Portability (LNP), to enable a competitor's telephone switch to provide local telephone service despite the fact that the competitor's switch is not directly coupled to the end user's customer premise.

AIN LNP triggers are activated by calls originating from, or directed to a telephone number or portion thereof, are set at SSPs. Normally, the first six digits of telephone numbers that have been ported to another physical location activate the LNP trigger in an SSP.

Once an LNP trigger is activated at an SSP, the SSP pauses the call that activated the trigger, and sends a call processing message to an SCP. The SCP accesses a LNP database that includes information associating ported telephone numbers to Location Routing Numbers (LRNs). Each LRN normally corresponds to a telephone switch, e.g., a competitor's switch, which is responsible for servicing one or more ported calls. Accordingly, the LRN is the number that identifies the SSP to which the called telephone number is ported. While one LRN is associated with each ported telephone number, normally, several ported telephone numbers are associated with the same LRN.

In response to an LNP trigger being activated the SCP obtains from an LNP database the LRN corresponding to the ported number which activated the LNP trigger. The retrieved LRN is placed in the called party field, and the actual called telephone number is placed in a spare field of a call completion message sent by the SCP to the SSP. This call processing data is returned to the SSP, where call processing is resumed. The SSP looks in the called party field and routes the call to the SSP identified by the LRN in the called party field, i.e., the SSP to which the telephone number was ported.

When an SSP receives a call directed to its LRN it extracts the actual called party number from the spare field and then proceeds to process the call using the extracted called party number. In this manner, using the actual telephone number, the call is completed to the called party by the second, e.g., competitors, SSP. This is not correct.

From the above discussion, it is clear that AIN functionality has been used to provide a wide range of services such as call forwarding and call screening. It has even been used to support competition between local telephone service providers. The transition to VOIP is particularly challenging since such functionality may not fully exist in VOIP networks.

In view of the above discussion, it is apparent that there is a need for methods of effectively moving voice and/or data from a PSTN environment to and from a (VOIP) environment. It is desirable that these methods be transparent or relatively transparent to the end user, e.g., customers should be able to receive their current telephone services regardless of being moved to or from a (VOIP) environment. In addition, the method should allow for gradual transition from the PSTN to a VOIP network.

SUMMARY OF THE INVENTION

The present invention is directed to methods and apparatus for transitioning from use of the PSTN to (VOIP) networks to provide telephone service.

In accordance with the present invention, telephone customers are allowed to keep their existing PSTN telephone numbers but receive telephone service from the VOIP network, e.g., using an IP telephony device. Methods and apparatus of the present invention for allowing telephone numbers to be ported to a (VOIP) network, in a manner that is relatively transparent to the telephone service subscriber, rely on the use of one or more AIN triggers set in the PSTN to facilitate the porting of the telephone number to the VOIP network.

In accordance with one feature of the present invention, rather than upgrade each existing telephone switch in the PSTN to support a connection to the (VOIP) network, a few switches in the PSTN are upgraded to include links, e.g., trunks, to the VOIP network and the functionality required to communicate calls between the (VOIP) network and the PSTN. Alternatively and/or in conjunction with upgrading some switches, new switches are added to the PSTN with links to the VOIP network. Telephone switches in the PSTN with links to the (VOIP) network are called gateway switches.

In accordance with SS7, a call normally comprises a data portion and an audio, e.g., voice, portion. In the PSTN the data portion of a call is normally transmitted using out of band signaling. In the case of IP telephony, both the audio and data portions of a call are transmitted using IP packets.

In the case of an originating PSTN call, the originating switch normally adds the data portion of the call, i.e., call origination information such as calling party information, to the voice portion received from the calling party's telephony device, e.g., telephone. In the case of IP calls, the call originating from the calling party's telephony device may include both a data portion, e.g., calling party IP address and/or other identification information, and a voice portion, e.g., packetized speech. Additional data may be added to a call by switches or other network devices used to forward the call or, alternatively, the network device forwarding the call may modify the data portion of the call. The data portion of a call normally includes fields such as a calling party field, a called party field and an alternate billing field. The calling party field may include, e.g., the calling party's telephone number. The called party field may include, e.g., the called party's telephone number. The data portion of a call may also include originating switch information, etc. These fields provide call related information which can be used for call screening, forwarding, billing and other purposes. For this reason, these fields are sometimes called information fields. The voice portion of the call normally includes audio, e.g., speech, obtained from the calling and/or called party.

Telephone numbers may be ported from one switch to another. Telephone numbers are normally assigned to be serviced by particular end office switches in blocks based on their numerical value, e.g., the first six or more digits of the telephone number. Thus, each telephone number corresponds to a block of telephone numbers which has been assigned to be serviced by a switch. Ported telephone numbers are telephone numbers which are serviced by a switch which differs from the telephone switch responsible for servicing the block of telephone numbers to which the ported telephone number corresponds. The switch to which a telephone number is ported may be in either the PSTN or VOIP networks.

Calls originating in the PSTN that are directed to telephone numbers which have been ported to the (VOIP) network, are first routed to the PSTN telephone switch which served as the ported phone number's terminating switch prior to the number being ported to the (VOIP) network. An AIN trigger, e.g., an LNP trigger, is set at the PSTN telephone switch from which the telephone number was ported to the VOIP network. The AIN trigger is set to be activated by calls to one or more telephone numbers that have been ported to the VOIP network. A six digit LNP trigger may be used for this purpose. When the trigger is activated, at a switch from which a telephone number was ported, call processing is paused and an SCP is contacted to determine what call processing should be performed. The SCP compares the called number which activated the LNP trigger to a database of ported numbers. If the telephone number is not in the database because it was not ported to the VOIP network, the call is allowed to be completed in the normal manner. If the called number was ported to the VOIP network, a gateway telephone switch associated with the ported telephone number being called is identified from the LNP database accessed by the SCP. The SCP then instructs the switch where the call was paused to forward the call to the gateway switch assigned to handle the particular called telephone number.

Assuming the telephone service subscriber to whom the ported number corresponds, subscribes to one or more AIN telephone services, e.g., Centrex, call screening, or call forwarding services, an AIN trigger will be set at the gateway switch which will be activated by forwarded calls directed to the subscriber number. If such a trigger is encountered, on the called party's number, call processing will be paused and call processing instructions will be obtained from the SCP in the normal manner in which AIN processing is used to control a call. Thus, telephone service subscriber's whose telephone numbers have been ported to the (VOIP) network can continue to receive PSTN based AIN services on calls routed to the party via the PSTN.

Assuming that the SCP determines that the call should be completed to the ported telephone number, following activation of an AIN trigger at the gateway switch, the SCP will instruct the gateway switch to complete the call to the called number. This will involve completing the call to the IP telephony device to which the telephone number corresponds via the IP network. In response to the call completion message from the SCP, the IP gateway switch will perform the necessary operations to convert the SS7 call to IP packets and route the call, via the VOIP network, to the called party. Conventional SS7 information, e.g., calling party and called party information, may be included with the packetized information transmitted in the form of IP packets to the called party.

In accordance with one feature of the present invention, prior to instructing the gateway switch in the PSTN to complete the call to the called number using the (VOIP) network, the SCP queries a database maintained in the IP network for information corresponding to the called telephone number. In accordance with the invention, the database of IP telephone number information is accessed through the use of either session initiation protocol (SIP) and/or ENUM which are two competing protocols for obtaining information relating to a telephone number used by an IP device and/or IP telephone service subscriber. SIP is described in document RFC 2543 dated March 1999, titled "SIP: Session Initiation Protocol", published by the Internet Society's Network Working Group. ENUM is described in document RFC 2916 dated September 2000, titled "E.164 number and DNS", which is also published by the Internet Society's Network Working Group.

Information obtained from having the PSTN device, e.g., SCP, access the IP network based IP telephone information database is used in various embodiments to determine how to complete a call directed to an IP telephony device. For example, if the retrieved information indicates that calls directed to the called telephone number are to be forwarded to a telephone number serviced by the PSTN, the call will be completed to the indicated "forward to" telephone number without being routed through the VOIP network. In other cases, if the retrieved information indicates the called party is busy, unavailable, lacks the required bandwidth, or does not accept calls in the language in which the call is being supplied, the calling party will be notified of the inability to complete the call and the call will be terminated without routing to the VOIP network. The playing of such call termination notification messages to the calling party may be performed by an IP coupled to the IP gateway switch or coupled to another switch in the PSTN in response to instructions received by the gateway switch from the service control point.

Thus, in accordance with the present invention, the need to convert and transmit calls from the PSTN to the VOIP network is reduced or eliminated. This most frequently occurs in the case where data available from the IP network indicates that the call can not be completed to the called telephone number in the (VOIP) network.

Calls may be placed from IP telephone devices in the VOIP network, corresponding to ported telephone numbers, to PSTN telephone numbers. In accordance with the present invention, such calls will be routed from the (VOIP) network to the PSTN through a PSTN gateway switch that has the ability to convert between a packetized call format and an SS7 call format. In accordance with the present invention, prior to or at the gateway switch, called party information, e.g., the telephone number of the called party is placed in a spare information field associated with the telephone call and the calling party number is inserted in the called party field of the IP telephone call directed to a PSTN number.

At the gateway switch, AIN triggers, e.g., one or more SDS triggers, are set to be activated by calls from the VOIP network based on the telephone number included in the called party field. Upon activation of such a trigger, call processing is paused and a TCAP message is sent to the SCP to determine what call processing should be performed. Upon receiving such a message, the SCP compares the called party number to an information database listing VOIP numbers and numbers which were ported to the VOIP network from the PSTN.

For numbers which were ported from the (VOIP) network to the PSTN, the accessed database will indicate the PSTN telephone switch which is responsible for performing call billing operations for calls originating from the calling party. This telephone switch will normally be the telephone switch from which the calling party telephone number was ported to the VOIP network. The SCP will generate a call completion message with the actual called party telephone number serving as the called party number. This information is obtained by the SCP from the spare field, e.g., alternate billing field, into which it was inserted prior to being sent to the SCP. In addition, the SCP supplies billing information to the gateway switch which is transmitted to the switch which is to perform billing for calls originating from the called party whose number was ported to the (VOIP) domain. In this manner, customers can be billed from the same switch which provided their telephone service prior to their telephone number being ported to the (VOIP) network.

In response to the call completion message, the call from the VOIP network will be routed to the called party in the PSTN domain using normal PSTN routing procedures. However, as noted above, the calling party will be billed for the call by the switch which performed this operation prior to the calling party telephone number being ported to the VOIP domain.

In the above described manner, using existing AIN telephone switch capabilities, PSTN telephone numbers can be ported to the VOIP network. This can be done with the ported customers still receiving all or many of the telephone services, e.g., AIN based services, which they received prior to agreeing to have their telephone number and telephone service switched to the VOIP network. In addition, large customers can limit the transition to the (VOIP) network to a subset of the telephone numbers they use without fear of losing services or being unable to switch back to PSTN service if problems are encountered. Furthermore, from the telephone company perspective, one or more lines serviced by an existing PSTN switch without having to provide hardware upgrades at the PSTN switch from which the telephone number is being ported. Thus, upgrading of individual PSTN switches to include (VOIP) network connectivity can be delayed until the number of (VOIP) users justifies such an upgrade.

Additional features, embodiments and benefits of the invention will be apparent from the detailed description which follows.

DETAILED DESCRIPTION

The present invention is directed to methods and apparatus for migrating from the Public Switched Telephone Network (PSTN) to a Voice Over Internet Protocol ((VOIP)) network, while keeping the transition relatively transparent to end users. Various methods and apparatus of the invention are directed to allowing for a gradual transition of subscribers from the PSTN to (VOIP) environment, and to minimizing the need to upgrade and/or replace PSTN hardware, e.g., telephone switches, during the transition process.

Figure 1:
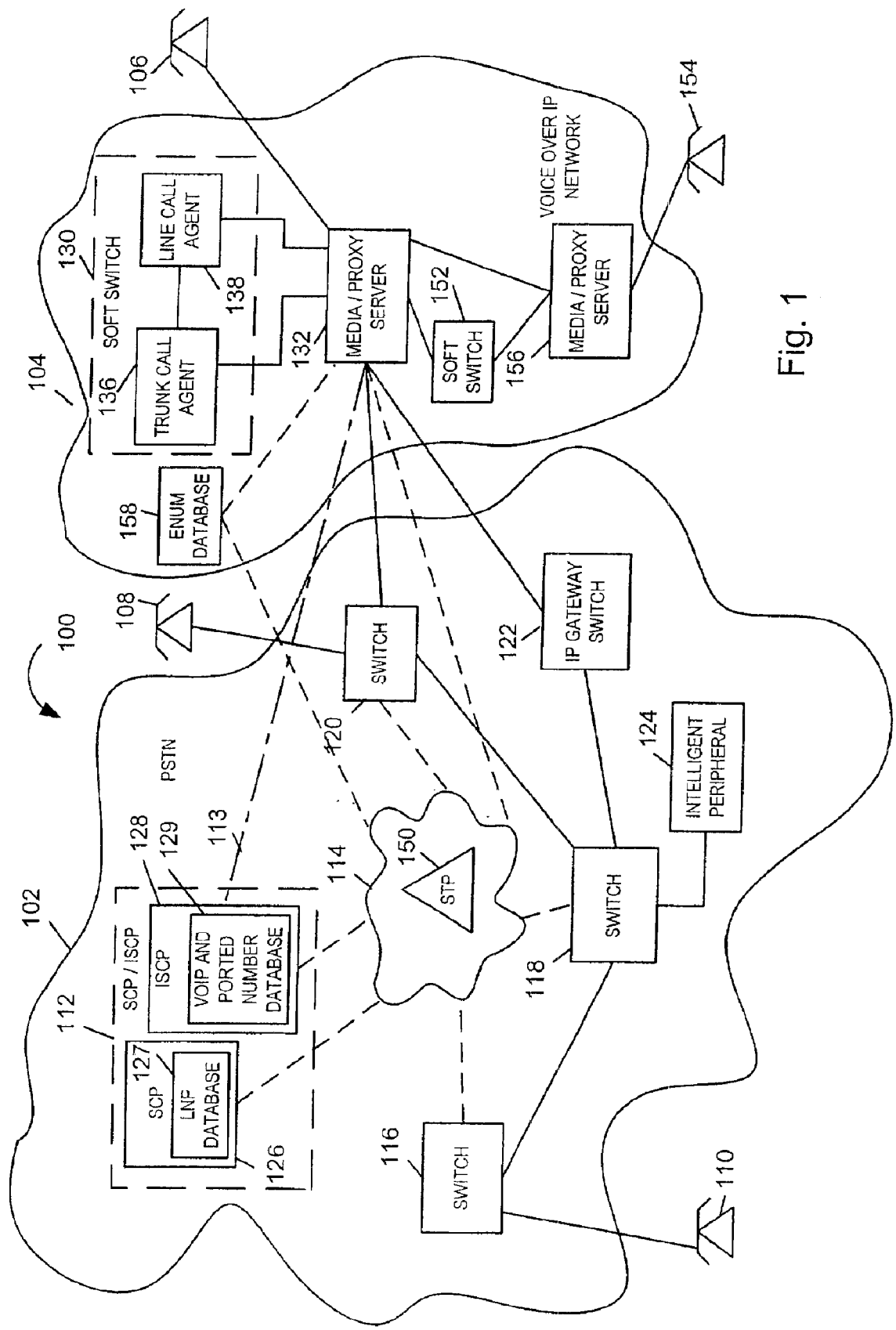
FIG. 1 illustrates a communications system implemented in accordance with the present invention.

FIG. 1 illustrates a communications system 100 implemented in accordance with the present invention. The system 100 comprises a plurality of telephones 106, 108, 110, 154, a PSTN 102, and a VOIP network 104. Telephones 108, 110 are conventional telephones, while telephones 106, 154 are IP (Internet Protocol) phones. End users, e.g., telephone service subscribers, may use any one of the telephones 106, 108, 110, 154 to initiate or receive a call. A telephone service subscriber initiating a call id often referred to as the calling party, while a telephone service subscriber to whom a call is directed is known as the called party.

The PSTN 102 comprises a plurality of telephone switches 116, 118, 120, coupled together as shown in FIG. 1. The switches (SSPs) 116, 118, 120 are responsible for routing calls to/from end user devices, e.g., telephones 110, 108 corresponding to calling or called parties. The switches 116, 118, 120 support AIN functionality including AIN triggers thereby allowing them to provide AIN based enhanced telephone services.

In addition to conventional switches 116, 118, 120 the PSTN 102 includes, a set of control and signaling connections 114 including one or more signal transfer points (STPs) 150. The connections 114 allow the various elements of the PSTN to exchange call control related messages and data.

The PSTN further includes one or more intelligent peripherals (IPs) 124, a service control point (SCP) 126 and an integrated service control point (ISCP) 128. Intelligent peripherals 124 are used to provide various services to callers including the playing of message prompts, speech recognition, and the collection of information, e.g., digits, from a caller in response to prompts. An SCP can instruct an SSP to connect a call to an IP and to have the IP play a message and/or collect information from the caller. Collected information may then be used to complete the call. SCP 126 and ISCP 128 serve the same general function in regard to responding to messages for call processing instructions. The ISCP includes an SCP in addition to various other components, e.g., AIN service setup and components. Accordingly, ISCPs provide greater functionality than SCPs. However, traditionally, SCPs 126 have been implemented with greater memory then ISCPs but this is not a requirement. The exemplary PSTN 102 includes SCPs 126 and ISCPs 128. However, the functions of these two elements could easily be combined into a single device 112. SCPs 126 because of their larger memory have often been used to provide LNP services. ISCPs 128, have been commonly used to provide a wide variety of Centrex services, call forwarding services, call screening services as well as other AIN based services.

For purposes of explaining the invention in later call flows, it will be assumed that SCP 126 is responsible for responding to messages resulting from activation of LNP triggers while ISCP 128 is responsible for responding to messages resulting from the activation of services to which individuals or corporate telephone users subscribe such as the aforementioned Centrex and call forwarding services.

In addition to the above discussed elements, the PSTN 102 includes an IP gateway switch 122. The IP gateway switch 122 couples the PSTN 102 to the VOIP network 104 and servers to interface between the PSTN and IP networks by performing any necessary signaling, packetization, and protocol conversions. IP gateway switch functionality can be incorporated into switches which also provide complete PSTN functionality. Such multiprotocol telephone switches may include links to both the PSTN 102 and VOIP network 104. Given the cost of telephone switches, it is desirable that the need to replace existing PSTN switches or to upgrade PSTN switches to include VOIP connection and functionality be limited until the demand for VOIP services at a given switch justifies the cost associated with such an upgrade. Thus, from a cost standpoint, during the initial transition to VOIP it is desirable to minimize the number of telephone switched required to have VOIP functionality and direct links to the VOIP network 104.

In accordance with one feature of the present invention, AIN LNP functionality is used to support the porting of telephone numbers from switches which do not have direct connections to the VOIP network to a switch, e.g., gateway switch 122, which does support (VOIP) functionality and has connections to the VOIP network 104. The switch to which the call is ported will then, in accordance with the present invention, service the call and perform billing operations as if the call were serviced by the switch from which the call was ported. In this manner, telephone customers can be provided with (VOIP) service from virtually any switch in the network without the need to replace or upgrade existing switches to interface directly with the VOIP network 104.

In accordance with the present invention, the SCP 126 includes a Local Number Portability (LNP) database 127 that includes a list of telephone numbers that have been ported from the PSTN 102 to a VOIP network 104, and the Local Routing Number (LRN) of the IP gateway switch assigned to service the particular ported number. LNP triggers are set on the ported lines at the switches 116, 118, 120 so that calls originating from the ported telephone lines or directed to the ported telephone lines will be re-routed via AIN LNP functionality to the assigned IP gateway switch.

The use of AIN LNP functionality to port (VOIP) calls to a non-local VOIP switch permits users to keep their existing telephone numbers while being ported from the PSTN to a VOIP network. The technique also allows users to continue to receive their existing PSTN based telephone services. In addition, from a cost standpoint has the significant advantage of allowing for a gradual transition from a PSTN to a VOIP network without requiring network wide hardware upgrades to the current switches.

The VOIP network 104, which is an IP based network, includes first and second soft switches 130, 154, first and second media/proxy servers 132, 156, an ENUM database 158. Soft switch 130 includes trunk call agent 136, and line call agent 138. VOIP network 104 may be implemented as part of the Internet, or as a part of a separate IP network which may or may not include links to the Internet. In the VOIP network 104, telephone calls comprise a stream of IP packets which may include call related data in addition to audio, e.g., voice, information. To complete a call in the IP network 104, IP packets are routed to from a calling party's IP telephony device, e.g., device 106, to the called party's IP telephony device, e.g., IP telephone 154.

Soft switches 130 include routing information and other control information associated with providing (VOIP) service, e.g., telephone service, to VOIP service customers, e.g., customers represented by VOIP telephone devices 106, 154. Depending on the implementation, the control and/or routing information and function may be implemented in the soft switch using one or more devices such as a trunk call agent 136 and a line call agent 138. The trunk call agent 136 includes control and routing information associated with various call trunks while the line call agent 138 includes routing and service information associated with individual user lines, e.g. telephones 106, for which soft switch 130 is responsible for, e.g., routing and billing functions. Media/proxy servers 132, 156 interact with the soft switches 130 and route IP telephone calls under direction of the soft switches 130, 152. Thus, IP calls and/or call related data are transmitted through these servers to their respective destinations. Soft switches 130, 152 provide calling and called information to the servers, then the servers determine routing and move the call to its ultimate destination, e.g., they determine the routing instructions for called numbers.

IP telephone calls can be routed under the direction of soft switches 130, 152 to the PSTN via the IP gateway switch 122 which interconnects the (VOIP) network 104 and PSTN 102. Similarly, soft switches can control the routing of calls received from the PSTN 102 via IP gateway switch 122 so that they are properly routed to an IP telephony device 106, 154. Thus, it is possible for calls to pass between the PSTN and IP domains with soft switches controlling call routing in the VOIP environment and PSTN switches controlling routing in the PSTN domain.

With regard to IP based telephony users, customer information may be stored in the VOIP network, e.g., at the soft switches 130 or in databases accessible to the soft switches 130 or via media/proxy servers 132, 156. Such information may include call screening information, call forwarding information, telephony device status information, customer name/address information and a wide variety of other types of information such as bandwidth capability. Such information can be useful in a wide variety of telephone call situations and, in many cases, can be used to determine whether a call directed to a VOIP telephone number can be successfully completed to the called number, will be redirected to another number (which may be a PSTN based telephone number) and/or if the call will not be able to be completed, e.g., because the called party's telephony device is not active or because the called party is unable to support the bandwidth required to accept the incoming call.

In accordance with various features of the present invention, as will be discussed below, prior to routing a call from the PSTN 102 to the VOIP network 104, information corresponding to a VOIP subscriber is accessed from the PSTN prior to the call being routed to the VOIP network 104. In this manner, the routing of calls from the PSTN to the VOIP network for calls which can not be completed, e.g., due to the called party's telephony device being inactive or because of called party call screening settings, is reduced or avoided. In addition, calls which would result in the call being redirected, e.g., forwarded, to a telephone number corresponding to the PSTN 102, can be routed in the PSTN domain without having to route the call to the (VOIP) network and then back to the PSTN 102 for call completion.

In accordance with the present invention, (VOIP) customer information may be accessed from the PSTN 102 in one of two ways. The first way of obtaining (VOIP) information involves the use of, Session Initiation Protocol, (SIP), to retrieve the desired information from the VOIP network 104. In the FIG. 1 illustrated, ISCP 128 includes a link 113 to media/proxy server 132 through which SIP messages and communications can be exchanged. In this manner, the ISCP 128 and SCP included therein, can obtain VOIP telephone service subscriber information and use that information in making PSTN call routing/completion decisions. The second way of accessing VOIP customer information from the PSTN network 102, is through the use of ENUM and an ENUM database. ENUM allows a telephone number to be provided, like a world wide website domain name, to an Internet Domain Name Server (DNS). The DNS returns, in response, telephone number related information such as an IP address corresponding to the supplied telephone number. The supplied telephone number may be an E.164 number which includes, e.g., telephone country code values.

The ENUM database can be used to facilitate users moving from location to location since such users can update the information in the ENUM database with a temporary IP address so that calls are directed to the user's current location at any given time.

In response to entry of a telephone number, the DNS returns information from an ENUM database. The ENUM database includes IP telephony information associated with a particular number. The telephone number associated information may include, e.g., IP address information to be used when routing IP calls to the entered telephone number, an E-mail address, and other information relating to or associated with the telephone number or service subscriber assigned to use the telephone number. Some of the information obtained using ENUM may be the same as, or similar to, information which could be obtained using SIP. However, SIP currently provides for a broader range of information to be stored and returned than does ENUM. Accordingly, while some embodiments involve the use of ENUM or SIP, other embodiments of the invention involve the use of both SIP and ENUM. In this manner, more information may be obtained than when only one of the two protocols is used to retrieve information associated with a telephone number.

The SIP and ENUM databases may include telephone number and other information corresponding to multiple parties, i.e., IP telephone device users.

A plurality of scenarios arises when migrating from a PSTN 102 to a VOIP network 104. FIGS. 2–5 illustrate process steps and the transfer of messages, data and other signals between components of the system 100 during different call/signal flows, which will be used to explain various features of the present invention.

The top row in each of FIGS. 2–5 illustrate system components which may be used during the exemplary flows in accordance with the present invention, e.g., to service a telephone call. The system components shown in FIGS. 2–5 are identified using the same reference numbers as used in FIG. 1. System components shown at the top of each of FIGS. 2–5 are grouped into two separate boxes 202, 204, with the left box 202 being used to indicate elements in the PSTN domain, which includes elements corresponding to PSTN 102, while the right box 204 is used to indicate system components in the (VOIP) domain which includes elements corresponding to (VOIP) network 104.

While the IP gateway switch 122 is shown as an element of the PSTN domain, it is to be understood that this network element 122 bridges the two domains and therefore, arguable belongs at least in part, in each of the PSTN and VOIP domains.

In the figures, the term calling party is used to identify the device 110 (and thus party) from which an exemplary call originates. The originating SSP 116 is the exemplary local SSP to which the calling party's telephone line is connected. The LNP SCP 126 is the SCP which is used to respond to activation of LNP triggers and includes the LNP database 127. The Centrex (CTX) SSP 120 is the exemplary SSP which provides Centrex services to a telephone device coupled there to via a telephone line for which Centrex services are being provided. The term CTX line is used to indicate the device or line associated with a Centrex service subscriber which receives service from the CTX SSP 120. The term AIN ISCP 128 is used to identify the ISCP 128, which for purposes of explaining the invention, is used to provide AIN services, including e.g., call forwarding and AIN based Centrex services. Thus, for purposes of the examples discussed in FIGS. 2–5 it is assumed that LNP triggers are serviced by SCP 126 while other AIN triggers result in servicing by the SCP included in ISCP 128. The second SSP is an SSP through which a call can be routed to, or received from the VOIP network 104. In various examples, the second SSP is the IP gateway switch 122. (VOIP) elements 132, 130, 152, 156, 154 correspond directly to the similarly named elements of FIG. 1 and therefore will not be discussed further at this point.

Solid arrows are used in FIGS. 2–5 to illustrate the routing of a call, while dashed arrows represent call processing signals, data, and/or messages passed between system components as part of servicing a call.

Figure 2:
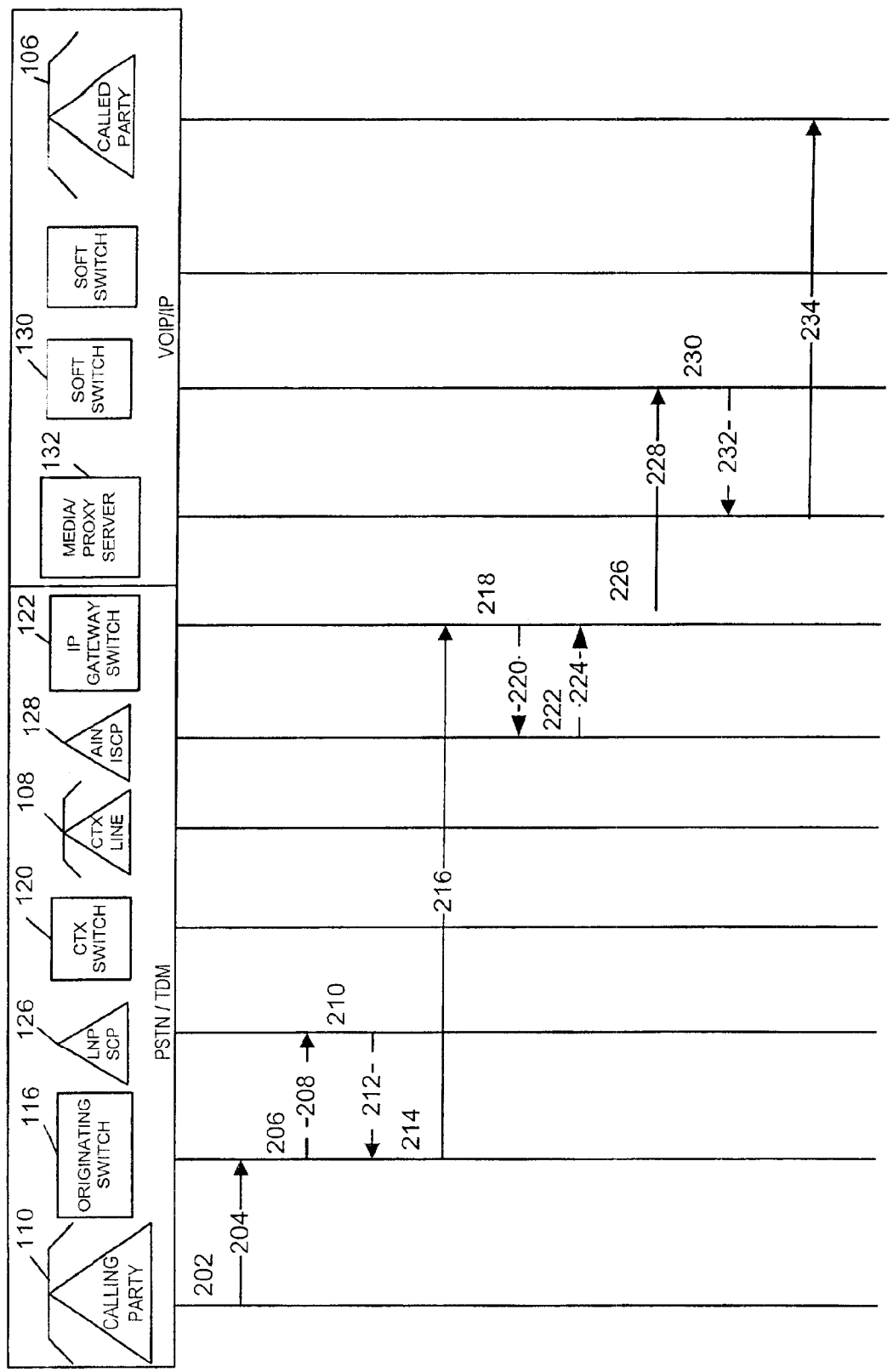
FIGS. 2 through 5 illustrate exemplary call processing flows associated with processing calls, originating from a PSTN telephone device, that are directed to a telephone number corresponding to an IP telephony device.

FIG. 2 is a call flow diagram illustrating call processing steps associated with an exemplary call originating from a device 110 coupled to the PSTN 102, that is directed to a telephone number (corresponding to called party 106) that has been ported to the (VOIP) network 104. The phone number has remained the same to maintain transparency despite the transition from the PSTN domain 202 to the VOIP domain 204.

The exemplary call begins in step 202 with the calling party 110 dialing a phone number, e.g., 301-774-4244, corresponding to, e.g., the called party using IP telephone device 106. In step 204 the call initiated in step 202 is transmitted to originating switch 116 which is connected to the calling party's customer premises.

In step 206, an LNP trigger set using digits of the called party's telephone number as part of the telephone number porting process of the invention is activated and the call processing is paused. In step 208, a call processing message, e.g., a TCAP message, is sent to Service Control Point (SCP) 126 in order to obtain call processing instructions. In response to the call processing message received in response to activation of the LNP trigger, the SCP 126 retrieves the Local Routing Number (LRN) associated in the LNP database 127 with the called telephone number. This may be done by accessing the database 127 using the called telephone number as an index thereto.

In addition, in step 210 the SCP 126 generates a call control message, e.g., a TCAP response message with the retrieved LRN, e.g., 301-520-6607, of the IP gateway switch 122. This LRN is placed in the called party field and the original called party's telephone number, e.g., 301-774-4244, in a spare field of the call control message. In step 212, the call control message, which includes the LRN, is returned to the originating switch 116. In step 214, the originating switch receives the response message and resumes call processing. Then, in step 216, the switch 116 routes the call using the number in the called party field, which is now the LRN of the gateway switch 122.

In step 218, IP gateway switch 122 recognizes the incoming call as being directed to its own LRN number used for receiving LNP forwarded calls. In response to detecting the LRN in the called party field, the switch 122 retrieves the real called party number from the spare field and then proceeds to process the call using the real called party number. As a result of the use of the real called party number, in step 218, one or more AIN triggers set on the called party's line may be activated. This is because the called party may subscribe to one or more AIN services, e.g., call forwarding services. These AIN services may be identical to AIN services which the called party was receiving prior to having his/her telephone number and service ported to the VOIP network 104. In such a case, an AIN terminating attempt trigger (TAT) or other AIN trigger would be set on the called party's line at the IP gateway switch 122. The flow diagram of FIG. 2 assumes a TAT is set on the called party's line at the gateway switch 122 and that the trigger is activated in step 218. As a result of activating the AIN trigger set on the called party's line, the IP gateway switch 122 pauses the call and generates a call processing message. In step 220, the switch 122 sends the call processing message to the ISCP 128 used to provide the called party with the AIN based services to which he or she subscribes. In response to the call processing message, in step 222 the ISCP 128 performs the functions associated with the AIN services to which the called party subscribes. This may include call screening and/or AIN based services such as call forwarding. As part of the call processing performed in step 222, the ISCP will access the appropriate CPR, e.g., the CPR corresponding to the called party and determine what further call processing, if any, should be performed. In this manner, the called party whose telephone number has been ported to the IP domain, can receive the same type of AIN services, e.g., call screening services, etc., as telephone service subscribers who have remained in the PSTN domain. In fact, if the called party was receiving AIN services prior to the number being ported to the (VOIP) domain, the called party can continue to receive those very same AIN services.

The exemplary call flow diagram of FIG. 2 assumes that the AIN processing results in the call ultimately being directed to the called party. This may be the case where, e.g., an AIN call screening service has determined that the call should be allowed to complete to the called party number. In other cases, the call might be forwarded and not allowed to complete to the original called party number.

In step 224, a call control message is returned to the IP gateway switch 122 which instructs the switch to complete the call to the called party number. In step 226, the IP gateway switch 122 determines that the called party number is in the VOIP domain and forwards the call to the soft switch 130, e.g., via a telephone trunk which connects the gateway switch 122 to the softswitch 130.

In step 230, the soft switch 130 looks at the called party number and proceeds to determine the IP address corresponding to the called party number to which the call should be routed. At this point the soft switch 130 can use a plurality of methods to determine the IP address to which the call is to be routed based on the called number 106. One method for determining the IP address is to consult proxy server functionality supported by media/proxy server 132.

In one embodiment of the present invention, the media/proxy servers include a database used for correlating phone numbers with IP addresses. In such embodiment in step 230 the trunk call agent 136 transmits a query to the proxy server functionality included in server 132 to determine the IP addressed to be used to route the call.

With the IP address of the called party determined, in step 232, the soft switch packetizes the call (voice and data portions) into IP packets with the necessary formatting and heading information added. In addition to packetizing the call, the soft switch instructs the proxy sever 132 to route the call using the called party's IP address. In step 236, the call, in the form of a plurality of IP packets, is directed to the called party's IP telephone 106 by the proxy server 132.

From the call flow of FIG. 2, it can be seen how a call can be directed to a called party whose telephone number has been ported to the VOIP network without the called party losing the use of AIN services which are provided via PSTN functionality. As the number of subscribers to AIN services who move to the (VOIP) network 104 increases, the services currently implemented in the PSTN domain, e.g., AIN services, may be implemented in the VOIP domain. However, by using the methods of the present invention, existing AIN functionality can be used until such time that it becomes more cost effective to implement the services in the (VOIP) domain.

Figure 3:
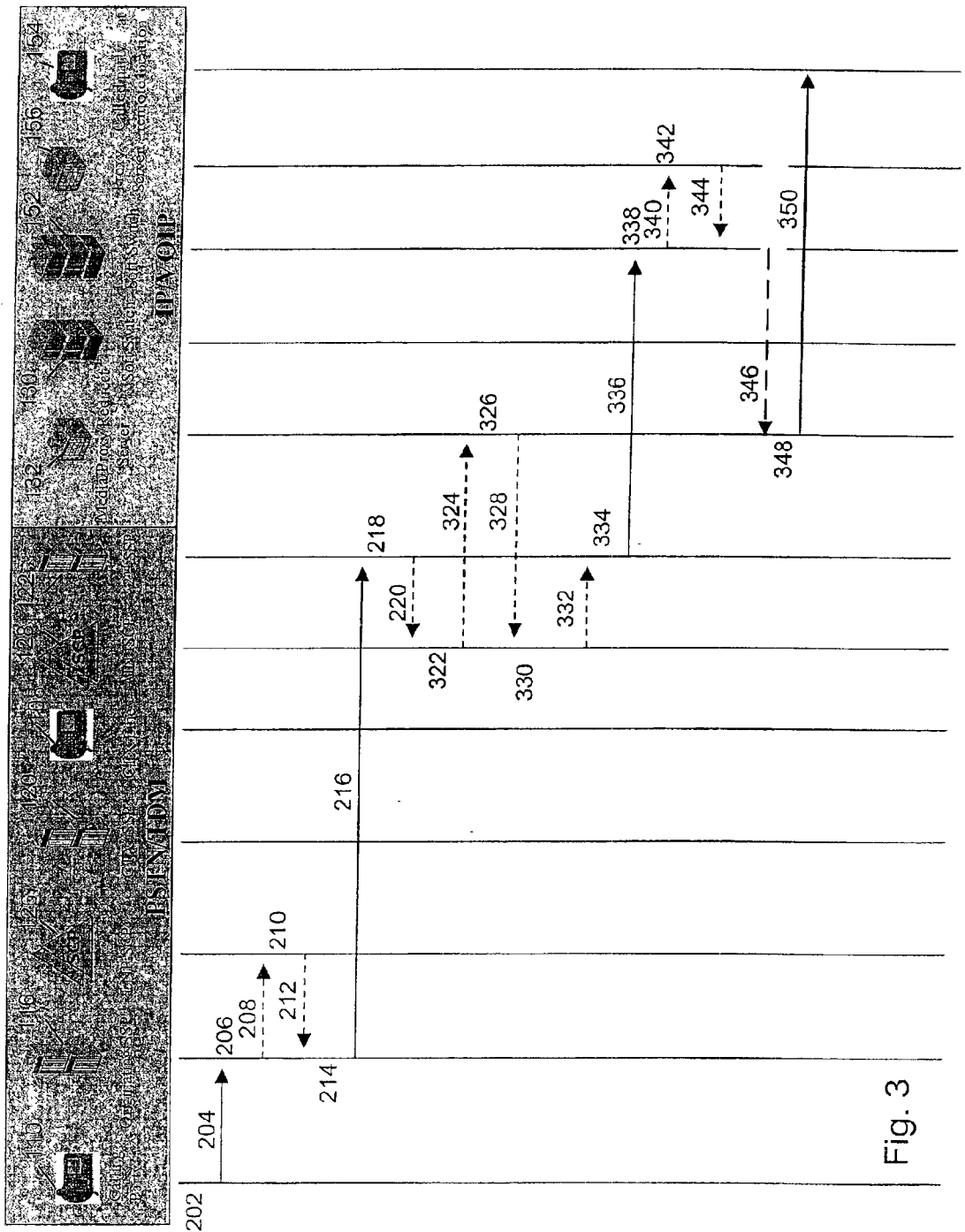
Figure 4:
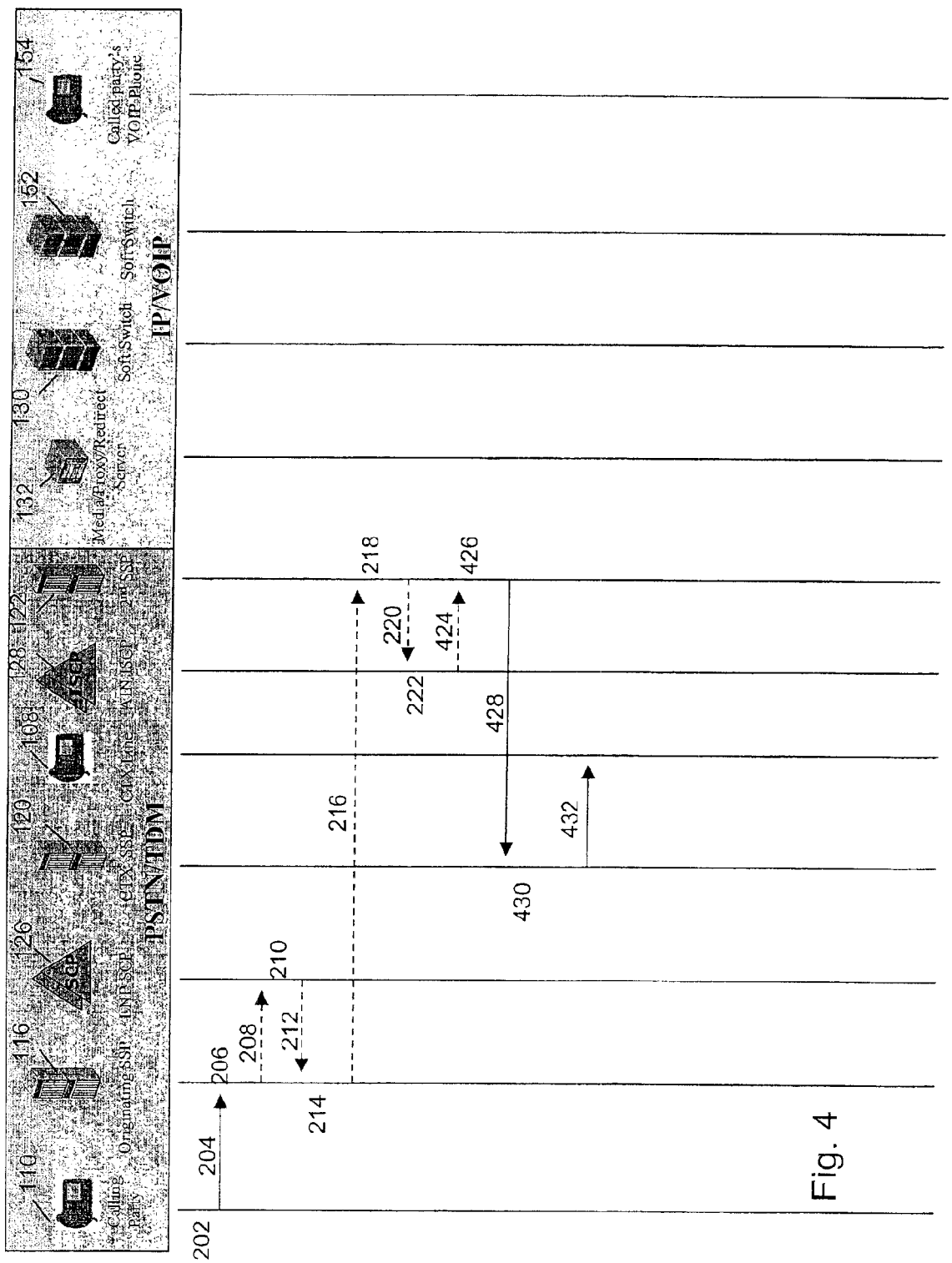
Figure 6:
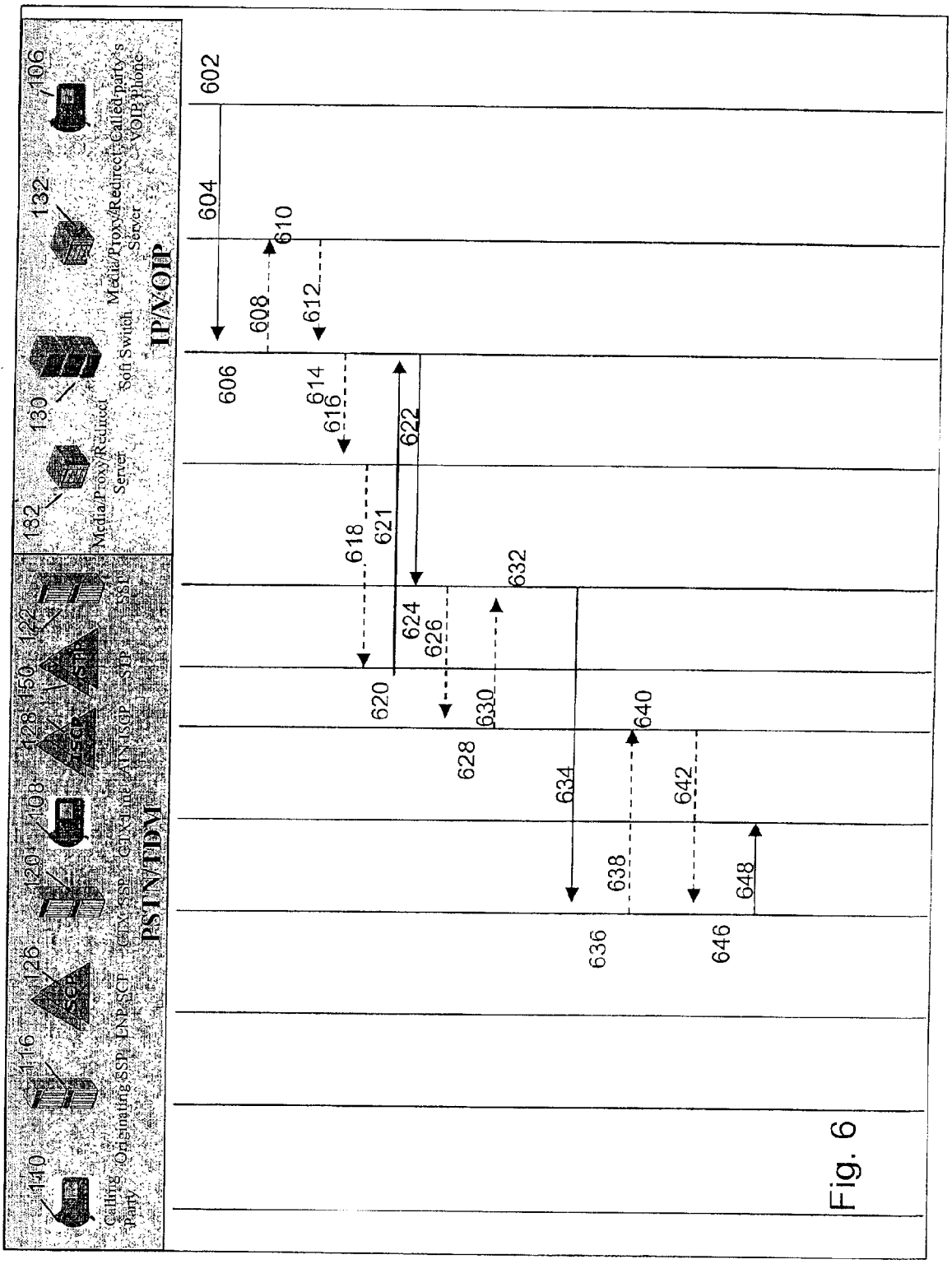
FIG. 6 illustrates a call flow diagram that shows the processing associated with a call originating from an IP telephony device that is directed to a telephone device in the PSTN.

In various embodiments, the LNP call forwarding feature of the present invention is used in conjunction with various other features such as the use of information obtained using SIP and/or ENUM in processing various calls placed from a telephone 110 located in the PSTN domain 204. Additional examples of call flows in which LNP forwarding is used in accordance with the invention are shown in FIGS. 3, 4, and 6. Each of these figures illustrate the use of one or more other call processing features of the invention in addition to the use of SIP. However in each of these additional call processing examples, the initial call processing steps, i.e., steps 202 through 222 are the same as the steps already discussed with regard to the the FIG. 2 example. Accordingly, for purposes of brevity, the discussion of steps 202 through 220 will not be repeated with regard to the discussions of the call flows shown in FIGS. 3, 4, and 6.

The use of SIP in conjunction with the LNP features of the present invention will now be explained by way of the example illustrated in FIG. 3. In the FIG. 3 example, SIP is used in accordance with the present invention when processing a telephone call originating from the PSTN that is directed to a called party in the (VOIP) network 104. In the FIG. 3 example, the Session Initiation Protocol (SIP) communications link between the ISCP 128 and the media/proxy server 132 is utilized to obtain called party information from the VOIP network prior to the call being transferred from the PSTN network 102 to the VOIP network 104. In the particular example, information obtained through the use of SIP, e.g. call forwarding information set in the VOIP network by the called party, is used to route the call to a different telephone number than the original called party number. The call forwarding number may correspond to, e.g., a remote location where the called party is working form on a temporary basis.

As in the FIG. 2 example, in the FIG. 3 example, the end user 110 serves as the exemplary calling party while end user 106 corresponds to the exemplary called party. End user device 154 corresponds to the call forwarding telephone number set by the end user 106.

Referring to the example of FIG. 3, call processing steps 202 through 220 are the same as steps 202 through step 220 of the FIG. 2 example. Accordingly, the discussion of the call processing steps of FIG. 3 will begin with step 322 wherein the ISCP 128 responds to a TCAP message in response to activation of an AIN trigger on set on the called party's line at the IP gateway switch 122 to which the call was forward via the use of LNP functionality.

In accordance with the invention a call processing record (CPR) associated with the called party number (a VOIP number), includes instructions to use SIP to obtain called party information from the VOIP network 104. For purposes of explanation, a CPR including such SIP instructions will be called a SIP CPR.

In the FIG. 3 example, the CPR associated with the called party at the ISCP 128 is a SIP CPR. In response to activation of the SIP CPR in step 322 the ISCP 128 generates a SIP message to obtain the desired called party information. In step 324, the ISCP 128 transmits SIP message, via the SIP communications link 113, to the media/proxy server 132.

In response to the SIP message, in step 326 the media/proxy server 132 accesses and/otherwise compiles information on the called party's 106 number and/or information relating to the VOIP network as part of a SIP response.

SIP information, e.g., instructions and/or other information, which can be returned to the ISCP 128 may include, 1) an instruction to route the call to a different number within the PSTN, 2) an instruction to route the call to a different number within the (VOIP) network 104, 3) call screening information, e.g., information indicating that the called party a) only accepts calls from specific identified callers, b) only accepts calls in specific languages, e.g., English or Spanish, c) only accepts calls that do not exceed a specific data rate. Thus, SIP information can include routing information, bandwidth information, security/screening information, etc. In addition, SIP allows for a host of other types of restrictions and/or information to be conveyed to the ISCP 128 and used in accordance with the invention for call processing and route determination purposes.

The routing information, which can be obtained through the use of SIP, may include call forwarding information set by the called party, e.g., as part of a call forwarding service. The ISCP 128 can redirect the call using forwarding telephone number or other routing information, if any, received from the server 132. Bandwidth availability information can be used to indicate how much bandwidth is available to the called party for purposes of the incoming call. If insufficient bandwidth is available, the ISCP 128 may, in accordance with the present invention, instruct the gateway switch 122 to terminate the call without transferring it to (VOIP) network 104 for delivery. Security information may include, e.g., call screening information. If a call is to be blocked because of call screening settings, the gateway switch may be instructed by the ISCP 128 to terminate the call without forwarding it to the (VOIP) network 104. In cases where a call is terminated without it being forwarded to the VOIP network, the ISCP may instruct the SSP 122 to send the call to an IP and for the IP to play the calling party a message indicating the reason the call can not, or is not, being completed.

In step 328, the server 132 returns information relating to the called party to the ISCP 128. The returned information sent to the ISCP 128 by the media/proxy server 132 gives the VOIP network 104 more information that can be used to control how calls will be routed and/or terminated than is available directly from the PSTN 102.

In the FIG. 3 example, call forwarding information is returned to the ISCP 128 in response to the SIP message. The information is used in step 330 to generate a call control message which will cause gateway switch 122 to redirect the call originally directed to called party 106 to the called party number corresponding to the telephone line corresponding to device 154.

In step 332, the ISCP 128 instructs the gateway switch 122 to complete the call to the call forwarding telephone number corresponding to device 154. If the call forwarding number corresponds to a PSTN telephone number, the call will be completed without being transmitted to the VOIP network 104 despite the fact that the original called party number was a VOIP network telephone number.

In the FIG. 3 example, the forward to telephone number corresponds to a VOIP telephone device 154. In such a case, the ISCP may receive an IP address corresponding to the device 154 as part of the SIP response. The received IP address and/or forward to telephone number may be supplied as part of the call completion message received by the IP gateway switch 122 from the ISCP 128.

In step 334 the IP gateway switch 122 receives and processes the call completion information provided by ISCP 128. In response to receiving the call completion information from the ISCP 128, in step 336 the gateway switch 122 routes the call to the VOIP network 104 for routing to the VOIP device 154. Thus, in step 336, the call is routed to the VOIP network 104, and more specifically to soft switch 152, e.g., through media/proxy server 132.

In step 338, soft switch 152 receives the call and uses one of a plurality of techniques to identify routing instructions, e.g., an IP address. Then in step 340 the soft switch 152 transmits a query to server 156, i.e., the server responsible for servicing calls to user device 154. Next, in step 342 the server 156 receives the query and determines the IP address that correlates with the called number. In step 344 the determined IP address is transmitted to the soft switch 152. Then in step 346 the soft switch 152 forwards the IP address to first media/proxy server 132. In step 350, the call is completed to end user device 154 to which the called party indicated calls were to be forwarded to.

FIG. 4 illustrates an example where a call originating in the PSTN 102 is directed to a called telephone number which has been ported to the (VOIP) network 104 from a telephone switch, SSP 120 (CTX SSP) which was used to provide Centrex service to the called telephone number prior to the telephone number being ported to the VOIP network. In accordance with the invention, despite LNP functionality being used to forward the call to the called party to the IP gateway switch 122 instead of to CTX SSP 120, the called party is still able to receive Centrex service. However, the service is triggered at the gateway switch 122 through the use of an AIN trigger rather than by a trigger set the CTX switch 120 from which the number was ported to the VOIP network. In the FIG. 4 example, the a Centrex service, e.g., a call forwarding service, causes the incoming call to be redirected from the called party's line to another Centrex line, i.e., a telephone line 108 coupled to and serviced by SSP 108. As will be noted, since the line to which the call is forwarded is in the PSTN 102, the call is never forwarded in the FIG. 4 example to the VOIP network despite the ported telephone number to which the call was originally directed being serviced by soft switch 130.

As in the FIG. 2 and FIG. 3 examples, the FIG. 4 example begins in step 202 with calling party 110 dialing the called party's phone number, e.g., 301-774-4244. Call processing then proceeds from step 202 through 220 as previously discussed with regard to the FIG. 2 example. When the call processing message arrives at the ISCP, in step 422, an active Centrex CPR is encountered and a call completion message is generated. The encountered call processing record (CPR) may be the same, or a CPR that is similar to, the Centrex call processing record that would have been encountered by a call directed to the called party prior to the telephone number being ported to the VOIP network 104.

In the FIG. 4 example, the active Centrex CPR includes instructions to forward call directed to the called party to another Centrex telephone line, i.e., the line corresponding to telephony device 108 identified by the exemplary telephone number 301-774-5200. In step 424, the call completion message generated in step 422, including the telephone number to which the call is to be completed in accordance with the Centrex forwarding operation, is sent back to the IP gateway switch 122.

In step 426, the IP gateway switch 122 receives the call completion message. Then in step 428 the IP routes the call using the call forwarding number supplied by the ISCP 128 resulting in the call being directed to CTX SSP 120 which serves as the terminating switch for the CTX line corresponding to device 108. In step 430, switch 120 receives the forward call and completes, in step 432, the connection to device 108 to which the call was forwarded.

Thus, in accordance with the present invention, a subscriber to an AIN service, e.g., an AIN based Centrex service, can continue to receive AIN based telephone services despite having been ported to the (VOIP) network 104.

As discussed above, ENUM is a protocol which, like SIP can be used to provide information relating to an VOIP telephone customer's capabilities, preferences, call forwarding settings, etc. In accordance some embodiments of the present invention ENUM is used as an alternative to, or in conjunction with, SIP as a way for a PSTN based device, e.g., ISCP 128, to obtain called party information from the VOIP network 104. In accordance with the present invention, the called party information obtained using ENUM may be used to make call routing and call completion information the same way that called party information obtained using SIP can be used.

Figure 5:
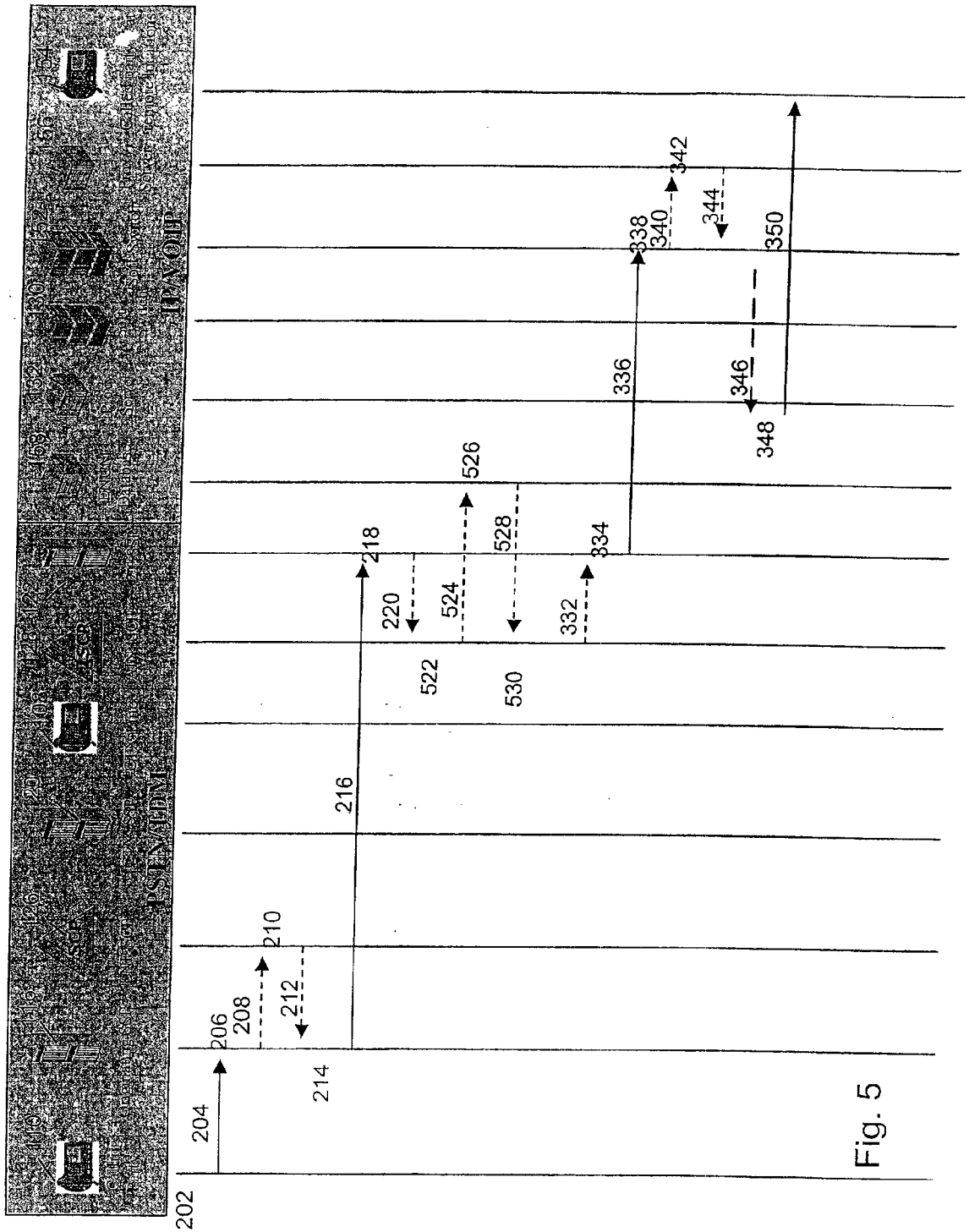

FIG. 5 illustrates a fourth example of a call placed from device 110 is directed to the telephone number corresponding to a telephone number which was ported to the VOIP network 104. The call processing shown in FIG. 5 is similar to the call processing previously described with regard to the FIG. 3 example. However, in the FIG. 5 example, rather than using SIP to obtain called party information and/or call processing instruction from the VOIP network 104 ENUM is used and the desired called party information is obtained from a database, ENUM database 158 in the VOIP network which includes the desired called party information, e.g., IP address information.

Much like the Internet's Domain Naming System (DNS), where domain names such as www.yahoo.com are stored with correlating IP addresses. In accordance with ENUM, telephone numbers are stored in an ENUM database 158 with correlating IP addresses and related information, e.g., E-mail addresses, call forwarding information, etc. The ENUM database 158 may be incorporated into the existing Internet DNS.

In the FIG. 5 example, call flow steps 102 through 220 are the same as discussed in regard to the FIG. 3 example. Accordingly, the discussion of the call processing steps of FIG. 5 will begin with step 522 wherein the ISCP 128 responds to a TCAP message in response to activation of an AIN trigger on set on the called party's line at the IP gateway switch 122 to which the call was forward via the use of LNP functionality.

In step 524 the ISCP 128 uses a Get_Data function to establish a communication link to the ENUM database 158 in an attempt to retrieve called party information from the VOIP network 104. In step 526 the ENUM database 158 is accessed and called party information, e.g., IP address, is retrieved using the called party's telephone number as an index into the ENUM database 158. In step 528, the called party information which is retrieved using ENUM may be the same as or similar to the above discussed information which could be retrieved using SIP. In the FIG. 5 example, as in the FIG. 3 example, for purposes of explaining the invention the returned called party information indicates that calls to the called party should be redirected, e.g., forward to the telephone number or IP address corresponding to user device 154. In step 530 the information received from the ENUM database access operation is used to generate a call completion message in the same manner as the information obtained using SIP was used in the FIG. 3 example.

The call is then completed to the telephony device 154 to which the called party directed incoming calls to be forwarded to by performing steps 332 through 350 in the same manner as discussed previously in regard to the FIG. 3 example.

In the above described manner ENUM can be used in accordance with the present invention as an alternative to SIP to retrieve called party information from the VOIP network 104.

The pervious call flow examples have all addressed processing a call from the PSTN directed to a telephone number which has been ported to the (VOIP) network. Exemplary processing of a call from a (VOIP) telephony device to a PSTN telephone number will now be discussed with reference to FIG. 6.

There is a greater variety of AIN triggers which can be activated based on the information included in the called party information field of a call then there are types of triggers that are responsive to information included in the calling party field of a call. Accordingly, it is often easier to design and implement AIN based services using triggers that are responsive to information in the called party field than it is to implement services based on information present in the calling party information field of a call.

In accordance with one feature of the present invention, calling party information is inserted into the called party information field of calls directed to the gateway switch 122 from the VOIP network 104. This allows the use of AIN triggers responsive to information in a call's called party information field, to be triggered by calling party information, e.g., the calling party's telephone number.

The insertion of calling party information into the called party field of a call may be performed by the softswitch used to forward the call to the gateway switch 122. To preserve the called party information, the soft switch, in accordance with the invention places the actual called party number into a spare field, e.g., an alternate billing information field of the call. As will be discussed below, a service control point or other network device can be used to recover the called party information after activation of an AIN trigger based on the information included in the called party field.

Rather than have the softswitch insert the called party information into the called party field of a call, the portion of the IP gateway switch 122 which is responsible for interfacing between the IP and PSTN networks 104, may place the calling party information in the called party field and the called party information in a spare field prior to the call being processed by the AIN trigger functionality included in the gateway switch 122.

Thus, in accordance with the invention, at the point AIN triggers may be triggered in the gateway switch 122 by calls from the VOIP network, the information included in the called party field will be the calling party ID, e.g., calling party's telephone number. Meanwhile the called party number will be included in a spare field such as an alternate billing field.

Furthermore, in accordance with the present invention, the ISCP 128 includes or can access a (VOIP) telephone number information database, e.g., a database including a list of VOIP telephone numbers from which calls may originate from the VOIP network 104. Billing to the calling party for such calls may be performed in accordance with the invention by the IP gateway switch 122 or a remote switch, e.g., switch 120. Billing is performed by the gateway switch 122 when the calling party number is local to the switch 122, e.g., corresponds to a PSTN line which was local to the gateway switch 122 before being converted to a VOIP number.

Billing is performed by a remote switch, e.g., Centrex switch 122, when the remote switch was responsible for serving as the terminating switch for the calling party telephone number prior to it being converted to an VOIP number. For VOIP telephone numbers which are to be billed by switches which are remote from the gateway switch 122, the VOIP telephone number information database includes information identifying the remote switch which is to perform the billing for calls from the listed VOIP number, and code which is to be included in an AMAslip ID to insure that correct billing to the called party number by the remote switch will occur. Each switch logs billing information including AMAslpID's which include the telephone number to be billed and the billing code which determines the billing to be performed. By transmitting AMAslpIDs from the gateway switch to the remote switch which previously serviced the calling party before the number was ported to the VOIP network 104, the calling party can be billed as if the transition to the VOIP network did not occur and/or by the same switch which previously performed the billing but at a different rate.

In the FIG. 6 example a calling party 106 whose number was ported from the PSTN to the VOIP domain originates a call from the VOIP network 104. The exemplary call is directed to a called party 108 located in the PSTN 102. As discussed above, from a billing perspective, it may be desirable to have the call billed as if it originated from the Centrex SSP 120 used to service the originating (calling party) telephone number before it was ported to the VOIP network 104. In this manner, changes in customer billing procedures as perceived by the customer, which may be important for business clients, can be minimized despite a telephone number being ported to the VOIP network.

For purposes of the example, the calling party's telephone number is (301-774-4244) while the called party's telephone number is 301-774-5200. For purposes of the example, the terminating switch for the exemplary called party has been selected to be CTX switch 120. This same switch also served the calling party before the calling party's telephone number was ported to the VOIP domain. Accordingly, CTX switch 120 will be used to perform calling party billing operations in accordance with the invention.

Gateway switch 122 serves as the link between the VOIP soft switch 130 and the CTX SSP 120 through which the called party in the PSTN 102 can be reached by the calling party in the IP network 104.

The FIG. 6 example begins in step 602 with the calling party dialing the called party's telephone number, e.g., 301-774-5200 into the IP telephone device 106. In step 604, the IP call which is received by the media/proxy server 132 and is routed to soft switch 130.

In step 606 the call is received at soft switch 130. Next, in step 608, the soft switch 130 sends a query to media/proxy server 132 seeking routing instructions for called number 301-774-5200.

In step 610, the media/proxy server 132 locates the called party's number in its database and finds that the number is a PSTN number. Since the number being called is in the PSTN 102, the proxy server will information the softswitch 132 to route the call to the local STP for SS-7 routing.

In step 612, the media/proxy server sends the routing information back to the soft switch 130 informing it to route the call to a local Signal Transfer Point (STP) 150 for SS7 routing. The soft switch 130 receives the instructions in step 614 and, in step 616, contacts its local media/proxy server 132 which has SS-7 connectivity. Next, in step 618, the media/proxy server 132 uses SS7 messaging to contact the local PSTN STP 150. In step 620, the STP 150 verifies that the requested call can be completed, e.g., the STP 150 checks to see if the called line is busy or if a no answer condition exists. If either of these conditions is detected by the STP 150, the STP 150 will inform the media/proxy server 132, and the calling party would hear a busy signal or a no answer condition indication under the direction of server 132 or softswitch 130.

In the FIG. 6 example, for purposes of the illustrated call flow, it is assumed that the called party is available to answer the call. In step 621 the called party status information, determined by the STP 150, is transmitted to the softswitch 130 via server 132.

In response to receiving an indication that the called party is available, the call is routed, in step 622 to the IP gateway switch 122 through media/proxy server 132. As part of this routing, the called party number is placed in a spare information field, e.g., alternate billing field and the calling party number is inserted into the called party field. This swapping of data in call information fields may be performed by the softswitch 130, server 132, or at the IP gateway switch 122 prior to the call being subject to AIN trigger processing.

In accordance with the present invention, an AIN Public Office Dialing Plan Trigger (PODP), which is a type of specific digit string (SDS) trigger, is set to be activated at the IP gateway switch 122 based on calling party numbers which may correspond to the VOIP domain. Thus, calls from the VOIP domain, received by the IP gateway switch, will cause an AIN trigger to be activated. For purposes of the example, the activated SDS trigger may be a six digit trigger set so that calls from a number starting with 301-774 will activate the trigger. The use of a six digit AIN trigger allows a single trigger to be used at the switch 122 for numerous telephone numbers. While some of the telephone numbers which activate the trigger may not be VOIP originating calls, it is often easier to have the SCP distinguish between VOIP and non-(VOIP) calls rather then set thousands of separate triggers on trunk lines, e.g., one per 10 digit VOIP calling party number.

In step 624 the IP gateway switch 122 receives the call originating from VOIP phone 106, the Specific Digit String (SDS) trigger is activated and call processing is paused. Next, in step 626 the IP gateway switch 122 sends a call processing message to the ISCP 128 seeking call processing instructions.

In step 628, the ISCP 128 scans the ten-digit phone number in the calling party field of the received TCAP message, e.g., 301-774-4244, and compares it to the telephone numbers in the VOIP information database. If the scanned calling party number is not a number that was ported to the VOIP network or a number originating from the VOIP network, it will not be listed in the (VOIP) number information database 129 in such a case, a continue instruction is returned to the switch 122 and the call is routed normally. Thus, telephone numbers which have not been ported to the VOIP network but which activate the trigger set at the gateway switch 122 will be completed in a manner that does not significantly interfere with call processing and is transparent to the called and calling parties.

However, in the FIG. 6 example the calling party number which has been inserted into the called party field is a VOIP number which will be listed in the (VOIP) number information database 129. Once the number in the called party field has been determined to be a (VOIP) number, the ISCP 128, in step 628, pulls the real called number, e.g., 301-774-5200, out of the alternate billing field. It then sends a message to the gateway switch to complete the call to the actual called number with the extracted called number being inserted into the called party field of the call completion message. If the calling party VOIP number is served locally by the gateway switch 122, the gateway switch will performing the call billing operations.

However, in the FIG. 6 embodiment, the remote switch 120 is indicated by the VOIP information database 129 to be responsible for call billing operations. Accordingly, in step 628, the ISCP generates billing instructions, e.g., AMAslpID, along with the call completion message so the call will be charged to the calling party from the switch 120, i.e., the switch from which the calling party telephone number was ported to the VOIP domain. In some embodiments the IP gateway switch may be the same switch that services the calling party number, i.e., the PSTN switch from which the number calling party number was ported to the VOIP domain. In such a case, the billing instructions to be provided to the remote switch 120 are not necessary and the call will be billed to the calling party from gateway switch 122.

In step 630, a call control information, correcting billing and including the correct called number in the called number field, is sent back to the IP gateway switch 122. In step 532, the IP gateway switch 122 resumes the call, and looks in the called party field for the called party's number to be used for routing purposes. The IP gateway switch 122 finds the correct called party number 301-774-5200 which was placed in the called party field by the SCP, and routes the call to switch 120 in step 534.

In step 636, the call is received at switch 120, where it incurs a TAT trigger since the called party is a Centrex subscriber. Call processing is paused and in step 638, a call processing message is sent to the ISCP 128. If a CPR associated with the called number, included special routing or an active service, the call would be routed or processed in according with the CPR instructions. In the FIG. 6 example, we assume that no routing or AIN services are active and therefore, the call should be completed to the called party's line. In step 542 the ISCP returns an instruction to the SSP 120 to complete the call to the called party, i.e., telephony device 108 which is on the called line.

In step 646 the call processing instructions are received from the ISCP and, in the call is completed to the telephony device by the SSP 120 in step 648.

Using the above described methods and apparatus of the present invention telephone users can gradually be moved from the PSTN 102 to VOIP network 104 in a relatively transparent manner. Significantly, in accordance with the invention large companies with multiple phone lines can be allowed convert a few lines at a time to the VOIP network without the need to make significant upgrades to the existing PSTN switches serving as terminating switches for the lines being moved to the VOIP network.

Numerous variations on the above described methods and apparatus are possible without departing from the scope of the invention.

What is claimed is:

1. A method of servicing telephone calls using an Internet protocol network and a telephone network the telephone network including first and second telephone switches each being coupled to at least one service control point, the second telephone switch being coupled to the first telephone switch and the Internet Protocol network, the method comprising the steps of:

pausing processing of a telephone call directed to a first telephone number at said first telephone switch, in response to activation of a first trigger set at said first telephone switch, the first trigger being activated by a call directed to a telephone number including a digit string matching at least a portion of said first telephone number, obtaining a call processing instruction including a second telephone number corresponding to said second telephone switch from a service control point;

forwarding the call to the second telephone switch using the second telephone number as a called party number for purposes of routing said telephone call, and operating the second telephone switch, in response to receiving the forwarded call, to:
i) replace the second telephone number with the first telephone number;
ii) contact a service control point to provide at least one advanced intelligent network service subscribed to by the called party, said service being one of a call screening and a Centrex service and to obtain call routing information corresponding to said first telephone number; and
ii) route the telephone call to the Internet Protocol network using Internet Protocol routing information returned by said service control point.

2. The method of claim 1, further comprising the step of:

operating the Internet Protocol network to complete the call to an IP telephony device using said first telephone number.

3. The method of claim 2, wherein operating the second telephone switch includes:

packetizing voice signals corresponding to the first telephone call to generate IP packets; and wherein the step of routing the first telephone call to the Internet Protocol network includes transmitting the generated IP packets.

4. The method of claim 1, further comprising:

pausing processing of said telephone call, in response to activation of a second trigger set at said second telephone switch which is responsive to at least a portion of said first telephone number; and said step of operating the second telephone switch to contact a service control point to obtain call routing information being in response to activation of said second trigger prior to routing the first telephone call to the Internet Protocol network.

5. The method of claim 4, wherein the first trigger set at said first telephone switch is a line number portability trigger.

6. The method of claim 5, wherein the second trigger set at said second telephone switch is a terminating attempt trigger.

7. The method of claim 1, wherein said second telephone switch is an IP gateway switch which includes a connection to both said telephone network and an IP connection for communicating IP packets including packetized voice signals to said IP network.

8. A method of servicing telephone calls using an Internet protocol network and a telephone network the telephone network including first and second telephone switches each being coupled to at least one service control point, the second telephone switch being coupled to the first telephone switch and the Internet Protocol network, the method comprising the steps of:

pausing, at said fist telephone switch, processing of a telephone call directed to a first telephone number corresponding to a called party, said pausing being in response to activation of a first trigger set at said first telephone switch, the first trigger being activated by a call directed to a telephone number including a digit string matching at least a portion of said first telephone number;

obtaining a call processing instruction including a second telephone number corresponding to said second telephone switch from a service control point;

forwarding the call to the second telephone switch using the second telephone number as a called party number for purposes of routing said telephone call; and operating the second telephone switch to:

i) replace the second telephone number with the first telephone number;

ii) pause processing of said telephone call, in response to activation of a second trigger set at said second telephone switch which is responsive to at least a portion of said first telephone number; and iii) contact a service control point in response to activation of said second trigger; and operating the service control point to provide at least one advanced intelligent network service subscribed to by the called party, said service being one of a call screening and a Centrex service; and operating the second telephone switch to route the telephone call to the Internet Protocol network using an Internet Protocol address corresponding to the first telephone number after said service control point provides said at least one advanced intelligent network service.

9. The method of claim 8, wherein said first telephone number is a telephone number which was ported to said Internet Protocol network; and wherein the advanced intelligent network service subscribed to by the called party is a call screening service which was subscribed to by said subscriber prior to said first telephone number being ported to said Internet Protocol network.

10. The method of claim 8, wherein the advanced intelligent network service subscribed to by the called party is a Centrex service.

11. A communications system comprising:

an Internet Protocol network including an Internet Protocol telephony device, a first telephone number being associated with said telephony device to be used for routing telephone calls to said telephony device; and a public switched telephone network, the public switched telephone network including:

i) a first telephone switch to which calls from other telephone switches in the public switched telephone network directed to said first telephone number are routed, a first trigger being set at said first telephone switch which is responsive to calls directed to a telephone number having at least a portion of which is the same as the first telephone;

ii) a second telephone switch coupled to the first telephone switch and to the Internet Protocol network, the second telephone switch including circuitry for packetizing calls and for routing calls to the Internet Protocol network;

iii) a first service control point coupled to said first telephone switch, the service control point including logic to provide at least one advanced intelligent network serve subscribed to by a called party, said service being one of a call screening and a Centrex service and for controlling the first telephone switch to forward calls directed to said first telephone number to the second telephone switch after activation of said trigger set at said first telephone switch.

12. The communications system of claim 11, further including a second service control point coupled to said telephone switch, the second service control point including control logic for determining an Internet Protocol Address from said first telephone number in response to a message for a call processing instruction from said second telephone switch; and wherein the second telephone switch includes a second trigger responsive to said first telephone number and means for pausing processing of a call activating said second trigger as part of an advanced intelligent network service.

13. The communications system of claim 12, wherein the first and second triggers are advanced intelligent network triggers.

14. The communications system of claim 13, wherein the first trigger is a line number portability trigger.

15. The communications system of claim 14, wherein the second trigger is a terminating attempt trigger set to be activated by calls directed to the first telephone number.

* * * * *